United States Patent [19]

Williams

[11] Patent Number: 4,562,771
[45] Date of Patent: Jan. 7, 1986

[54] FLIP-OVER DRIVE SYSTEM FOR A REMOVABLE OVEN ROTISSERIE

[75] Inventor: James E. Williams, Stamford, Conn.

[73] Assignee: Cuisinarts, Inc., Greenwich, Conn.

[21] Appl. No.: 652,339

[22] Filed: Sep. 19, 1984

[51] Int. Cl.$^4$ ............................................. A47J 37/04
[52] U.S. Cl. ...................................... 99/397; 99/427; 99/446; 126/338
[58] Field of Search ................. 99/396, 397, 402, 446, 99/421 R, 421 P, 421 H, 427, 443; 126/338; 426/523; 74/70, 434

[56] References Cited

U.S. PATENT DOCUMENTS

| | | | |
|---|---|---|---|
| 2,297,825 | 10/1942 | Bobo | 99/397 |
| 2,324,233 | 7/1943 | Parsons | 99/421 P |
| 2,387,621 | 10/1945 | Stangle | 99/397 |
| 2,833,205 | 5/1958 | Purtzer | 99/421 P |
| 3,124,057 | 3/1964 | Kiser | 99/421 H X |
| 3,196,776 | 7/1965 | Norton | 99/421 P |
| 3,633,491 | 1/1972 | Williams | 99/421 H X |
| 3,691,937 | 9/1972 | Meek | 99/446 X |
| 4,114,523 | 9/1978 | Eff | 99/427 X |

Primary Examiner—Billy J. Wilhite
Attorney, Agent, or Firm—Parmelee, Bollinger & Bramblett

[57] ABSTRACT

A flip-over drive system for a removable oven rotisserie comprising drive means, gear train means driven by the drive means, cam means mechanically coupled to the gear train means for rotation in response to the driving of the gear train means by the drive means, escapement means position for periodic engagement with the cam means, socket means mechanically coupled to the escapement means, the socket means being configured to receive a rotisserie shaft therein, whereupon the socket means and the rotisserie shaft upon being received therein are rotated to a first predetermined angular position upon engagement of the escapement means with the cam means and remain in the first predetermined angular position for a predetermined dwell period until the cam means re-engages the escapement means whereupon the socket means and the rotisserie shaft are rotated to a second predetermined angular position and remain in the second predetermined angular position for a predetermined dwell period.

36 Claims, 10 Drawing Figures

Fig. 5F

FLIP-OVER DRIVE SYSTEM FOR A REMOVABLE OVEN ROTISSERIE

BACKGROUND OF THE INVENTION

The present invention relates to oven rotisieres, and more specifically to a flip-over drive system for a removable oven rotisserie.

Continuously driven rotisseries are known for outdoor barbecue grills as well as for indoor ovens. Further, it is known from U.S. Pat. No. 2,324,233 (Parsons), U.S. Pat. No. 2,833,205 (Purtzer) and U.S. Pat. No. 3,196,776 (Norton), to provide a continuously rotating shish kebob rotisiere having skewer ends with star-shaped wheels to contact a fixed pin once during each revolution of the rotissiere to provide a partial rotation of each individual skewer as it passes the fixed pin.

SUMMARY OF THE INVENTION

It is an object of the present invention to provide a flip-over drive system for a removable oven rotisserie.

It is a further object of the present invention to provide a portable rotisserie for use with an oven broiler.

It is a still further object of the present invention to provide a multi-position drive system for an oven rotisserie to facilitate the selection of continuous or periodic rotation of the rotisserie.

It is a still further object of the present invention to provide a compact drive system for an oven rotisserie which drive system is capable of being actuated by a battery driven power source.

It is a still further object of the present invention to provide a flip-over drive system for a portable oven rotisserie which provides a predetermined dwell period.

Briefly, in accordance with the present invention, a flip-over drive system is provided for a removable oven rotisserie comprising drive means, gear train driven by said drive means, cam means mechanically coupled to gear train means for rotation in response to the driving of the gear train means by the drive means, escapement means positioned for periodic engagement with the cam means, socket means mechanically coupled to the escapement means, the socket means being configured to receive a rotisserie shaft therein, whereupon the socket means and the rotisserie shaft upon being received therein are rotated to a first predetermined angular position upon engagement of the escapement means with the cam means and remain in the first predetermined angular position for a predetermined dwell period until the cam means re-engages the escapement means whereupon the socket means and the rotisserie shaft are rotated to a second predetermined angular position and remain in the second predetermined angular position for a predetermined dwell period.

Other objects, aspects and advantages of the present invention will be apparent from the detailed description, considered in conjunction with the drawings, as follows:

DETAILED DESCRIPTION

Figure 1:
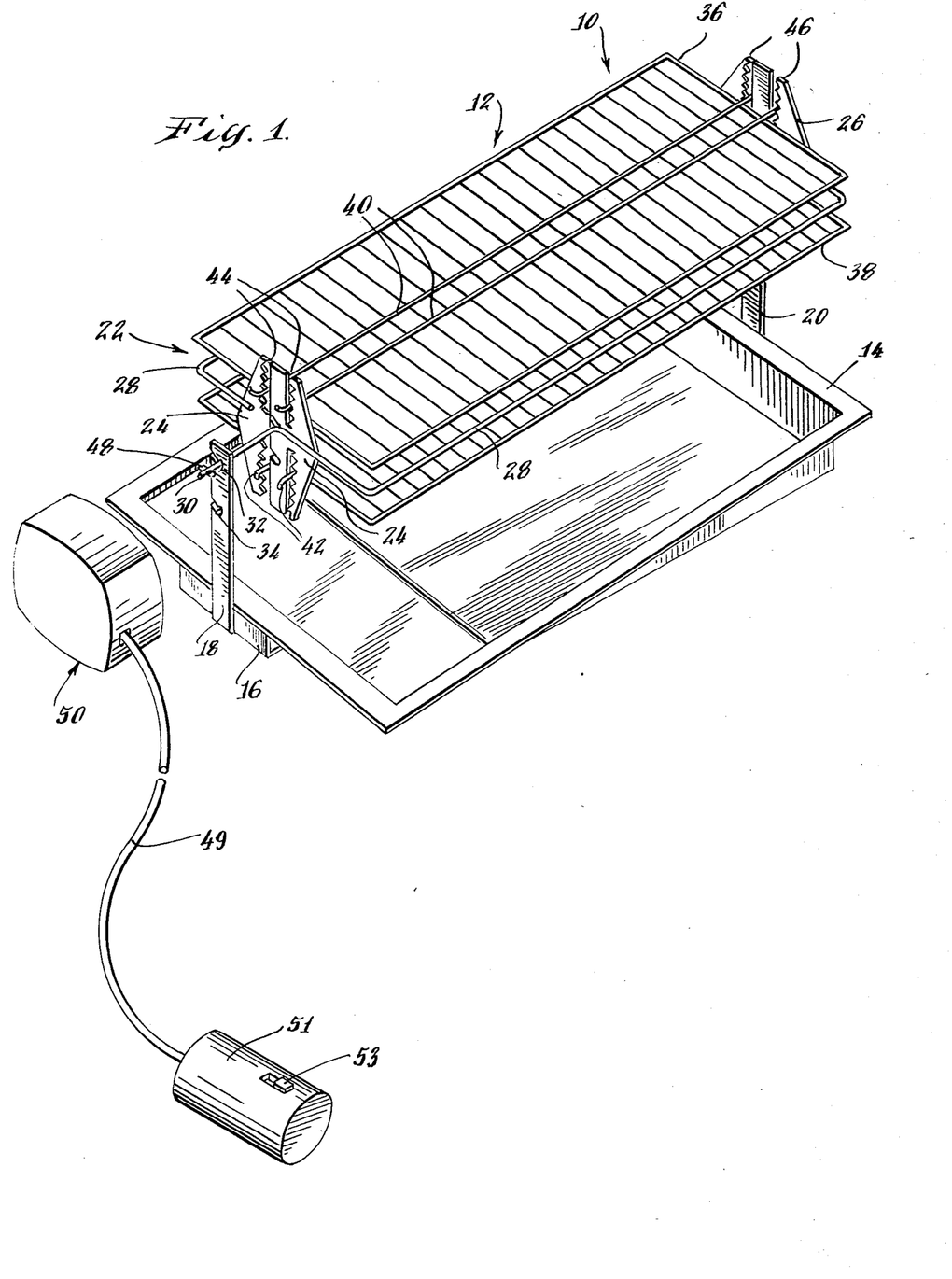
FIG. 1 is a perspective view of a flip-over drive mechanism and removable oven rotisserie in accordance with the present invention.

Referring to FIG. 1, a removable oven rotisserie and its accompanying flip-over drive system are indicated generally at 10. The rotisserie 12 is compact in size and dimensioned for ease of insertion and removal from a kitchen oven. An inclined grease pan 14 is positioned at the bottom of the rotisserie 12 for stable positioning of the rotisserie 12 on the floor of an oven. The rotisserie 12 includes bracket extension 16 (only one of which is visible in FIG. 1) affixed to the grease pan 14. A pair of vertical brackets 18 and 20 are mounted to the bracket extensions 16, e.g., permanently with a rivet or, preferably, temporarily with wing nuts (not shown).

Mounted to the vertical brackets 18 and 20 is a rotatable rotisserie grill 22. The rotatable rotisserie grill 22 includes a pair of end plates 24 and 26 interconnected by a peripheral frame member 28. The opposite ends of the peripheral frame member 28 which are designated 30, only one of which is visible in FIG. 1, are axially aligned with one another and extend outward in a plane perpendicular to the plane of the end plates 24 and 26 to provide an axis about which the rotatable rotisserie grill 22 can be rotated. Advantageously, each of the vertical brackets 18 and 20 includes inclined slots 32 and 34 for receiving the ends 30 of the peripheral frame member 28 to adjust the vertical position of the rotatable rotisserie grill 22 relative to the horizontal broiler located in the top of a kitchen oven by positioning the ends 30 of the peripheral frame member 28 in the desired slots 32 or 34.

A pair of upper and lower horizontal grill members 36 and 38 are removably coupled to the end plates 24 and 26 by pairs of longitudinal grill extensions 40 and 42, respectively. The relative vertical positions of the horizontal grill members 36 and 38 can be adjusted by adjusting the position of the longitudinal grill extensions 40 and 42 in toothed vertically slotted pairs 44 and 46 formed in end plates 24 and 26, respectively, to securely hold or sandwich the food to be grilled between the horizontal grill members 36 and 38, as well as moving the food upward or downward relative to the horizontal broiler to increase or decrease the cooking temperature of the food, as desired. Desired positioning of the horizontal grill members 36 and 38 is accomplished by squeezing together the ends of the pairs of grills extensions 40 or 42 thereby releasing the horizontal grill member 36 or 38 from their positions in toothed vertically slotted pairs 44 and 46 and then releasing the squeezed ends of the pairs of grill extensions 40 or 42 to return them to their original position when they are at the desired height in the toothed vertically slotted pairs 44 and 46.

The end 30 of the peripheral frame member 28 includes a swaged area or end portion 48 for mating with a flip-over drive mechanism 50, which will be described in more detail below. Advantageously, the flip-over drive mechanism 50 is electrically coupled to an energy source 51, which includes, e.g., a 1.5 V dry cell battery (size "D" cell), with insulated leads 49. The flip-over mechanism 50 is electrically connected to the energy source 51 by an on-off switch 53 located at the energy source 51.

Figure 2:
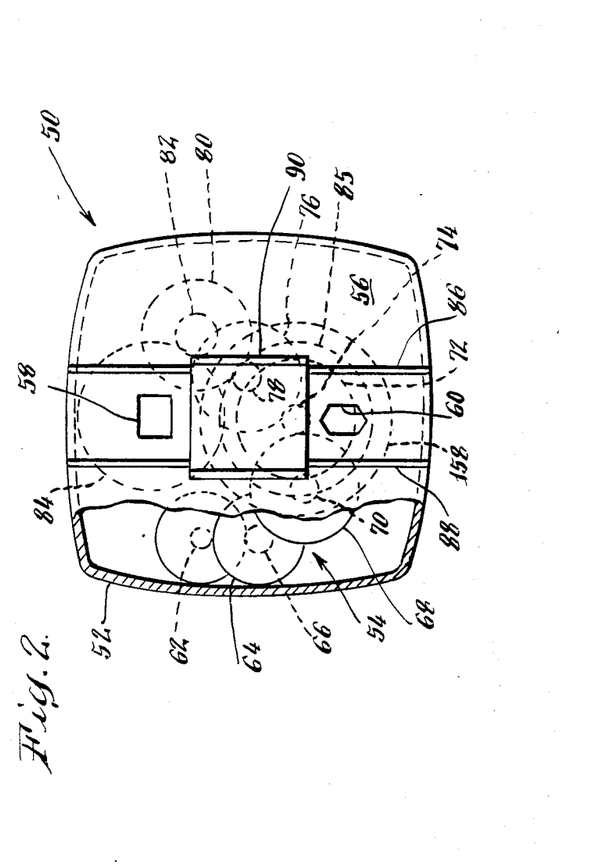
FIG. 2 is a rear elevational view of the flip-over drive mechanism showing the gears of the gear train.

Referring to FIG. 2, the compact nature of the flip-over drive mechanism 50 is illustrated. The flip-over drive mechanism 50 includes a metal housing 52 within which is housed a motor driven gear train 54. Formed in and extending inwardly from the rear wall 56 of the flip-over drive mechanism 50 is a pair of sockets 58 and 60, both configured to receive the swaged end portion 48 of the peripheral frame member 28, see FIG. 1. Preferably, the socket 58 has a generally square configuration to receive the swaged end portion 48 diagonally in any one of four positions and the socket 60 has a generally hexagonal configuration to receive the swaged end portion 48 in any one of two positions.

The preferred arrangement for the gears of the gear train 54 within the housing 52 is illustrated in FIG. 2. A motor driven pinion 62 meshes with a first gear 64. A pinion portion 66 of the first gear 64 meshes with a second gear 68. A pinion portion 70 of the second gear 68 meshes with a third gear 72. A pinion portion 74 of the third gear 72 meshes with a fourth gear 76 which has a pinion portion 78 which meshes with a fifth gear 80. The fifth gear 80 has a pinion portion 82 which meshes with a sixth gear 84. The sixth gear 84 is mechanically coupled to the socket 58 to continuously rotate the socket 58 and therefore the rotissiere grill 22 when the swaged end portion 48 of the peripheral frame member 28 is positioned within socket 58. The sixth gear 84 meshes with a seventh gear 85 for periodically rotating the rotissiere grill 22 when the swaged end portion 48 of the peripheral frame member 28 is inserted within the socket 60, as will be described in more detail with reference to FIGS. 4 and 5A–F.

Figure 3:
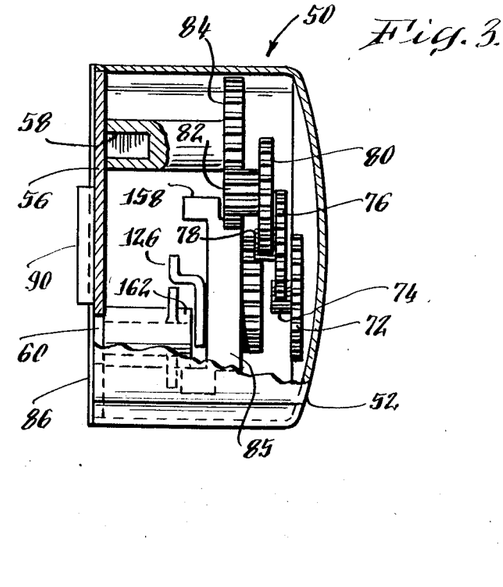
FIG. 3 is a side elevational view of the flip-over drive mechanism of FIG. 2.

Referring to FIG. 2, advantageously, the bottom wall 56 of the housing 52 of the flip-over drive mechanism 50 includes parallel spaced longitudinal ridges 86 and 88 formed thereon to accommodate a removable spring mounting clip 90 dimensioned to slip onto the vertical bracket 18, see also FIG. 3. The mounting clip 90 is dimensioned to be clipped or pressed onto the parallel spaced longitudinal ridges 86 and 88, and then clipped onto the vertical bracket 18 to hold the flip-over drive mechanism 50 in a fixed position relative to the rotisserie grill 22 when the swaged end portion 48 of the peripheral frame member 28 is positioned within socket 58 or 60.

Figure 4:
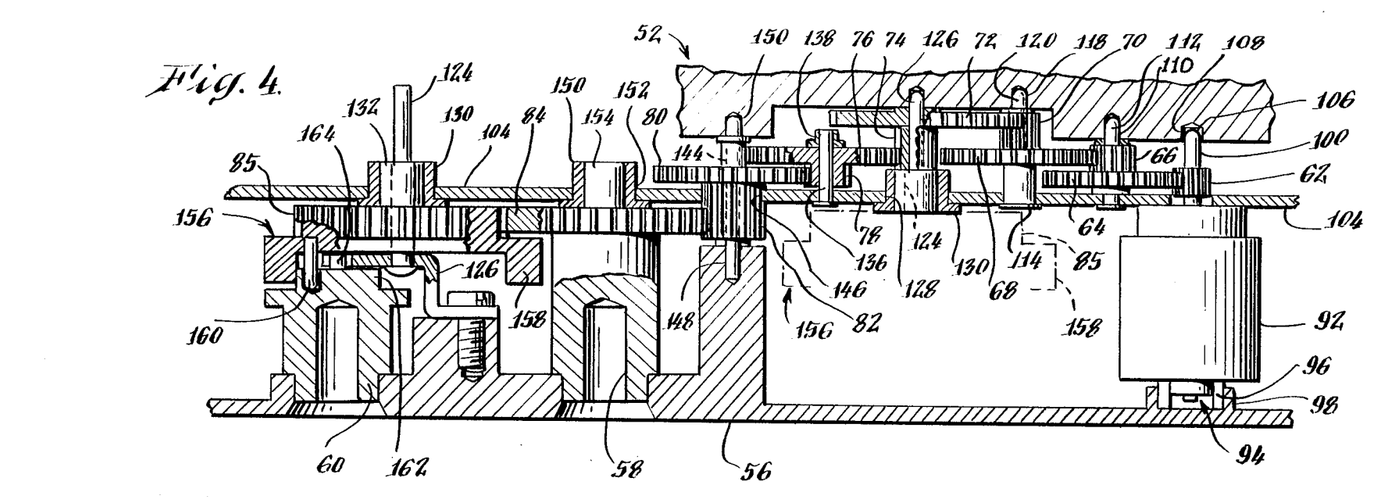
FIG. 4 is an enlarged view of the components of the flip-over drive mechanism of FIG. 2 with the gear train unfolded to facilitate description.

Referring to FIG. 4, the sequence of meshing of the gears of the great train 54 and the step-up relationship between gears 64, 68 and 72 and the step-down relationship between gears 72, 76, 80 and 84 is illustrated. The gear train 54 is enlarged and somewhat alternated from the actual physical arrangement of FIG. 2 and 3 to facilitate description. The flip-over drive mechanism 50 includes a DC motor 92, e.g., a 1.5 V permanent magnet motor, fixedly mounted in the housing 52. Advantageously, the DC motor 92 includes a motor mount 94 with a flat area 96 for coacting with slots 98 in the housing 52 to prevent rotation of the motor 92 on its mount 90 while the motor 92 is energized.

Extending upwardly from the motor 92 is a motor drive shaft 100 having pinion 62 affixed thereto for rotation therewith. The pinion 62 may have, e.g., 8 teeth. The motor 92 is also held in position within the housing 52 by a support frame 104. The end 106 of the drive shaft 100 is positioned within a cut-out 108 formed within the housing 52 to accommodate rotation of the drive shaft 100 without interference with the housing 52.

The first gear 64, e.g., with 37 teeth, is positioned proximate to the pinion 62 to provide working contact or meshing therewith upon rotation of the pinion 62. The first gear 64 is mounted for rotation to a pin 112 which extends through the support frame 104 and is received in a notch 110 formed in housing 52. The first gear 64 includes a pinion portion 66, e.g., with 10 teeth, to provide working contact or meshing with the second gear 68 having, e.g., 42 teeth. The second gear 68 is arranged proximate to the pinion portion 66 of the first gear 64 for rotation therewith.

The second gear 68 is mounted for rotation on a stepped shaft 118 which extends through the support frame 104 and is received in a notch 120 formed in housing 52. The second gear 68 includes pinion portion 70 having, e.g., 10 teeth, to provide working contact or meshing with the third gear 72, having, e.g., 48 teeth. The third gear 72 is mounted for rotation on a stepped pin 124 affixed at one end to a flange 126. The other end of the stepped pin 124 is received in a notch 126 formed in housing 52. Advantageously, the seventh gear 85 is also mounted for rotation about stepped pin 124 which extends through an opening 128 in the support frame 104. A bushing 130 is positioned in the opening 128 and surrounds an upper reduced diameter portion 132 of the seventh gear 85 also positioned in the opening 128.

The third gear 72 also includes pinion portion 74 having, e.g., 10 teeth positioned for working contact or meshing with the fourth gear 76 which is mounted for rotation to a pin 136 which extends through the support frame 104 and has a stationary retainer clip 138 mounted on its remote end. The fourth gear 76 also includes pinion portion 78 having, e.g., 10 teeth positioned for working contact or meshing with fifth gear 80. The fifth gear 80 is positioned proximate to the pinion portion 78 of the fourth gear 76 for working contact or meshing therewith and has, e.g., 42 teeth. The fifth gear 80 is mounted for rotation to a pin 144 which extends through an opening 146 in the support frame 104. The pin 144 is retained within housing 52 in notches 148 and 150. The fifth gear 142 has pinion portion 82 with, e.g., 10 teeth for engagement with sixth gear 84 having, e.g., 38 teeth. The sixth gear 84 is positioned proximate to the pinion portion 82 for working contact or meshing therewith and is held in its relative position by a brushing 150 surrounding a reduced diameter portion 154 of the sixth gear 84 and positioned in an opening 152 in the support frame 104. The sixth gear 84 is also mechanically coupled to the socket member 58, which is configured in the form of, e.g., a square, for continuous rotation with the sixth gear 84.

The sixth gear 84 is positioned for working contact or meshing with the seventh gear 85 which is mounted for rotation about the stepped pin 124. The seventh gear 85 includes, e.g., 38 teeth and has a cam member 156 extending downwardly therefrom with a peripheral portion 158 and a downwardly extending finger or projection 160. The finger 160 is configured to periodically engage a rotable escapement member 162 during rotation of the seventh gear 85. The escapement member 162 is pinned to the flange 126 by pivot pin 164 for rotation relative thereto and is mechanically coupled to the socket member 60, which is configured in the form of, e.g., a hexagon, for rotation with the escapement member 162.

Referring to FIGS. 5A–F, the interaction between the cam member 156, specifically the finger 160, and the escapement member 162 during rotation of the seventh gear 85 is illustrated. The escapement member 162 is generally oval or football shaped with its periphery configured to conform to and ride against the periphery 158 of the cam member 156 during rotation of the seventh gear 85. Moreover, the escapement member 162 includes a pair of diametrically opposed slots 166 and 168 formed at opposite open ends 170 and 172, respectively, of the escapement member 162. The slots 166 and 168 have a generally curved shape which generally conforms to the periphery of the escapement member 162. The cam member 156 will rotate continuously with the seventh gear 85 and will rotate relative to escapement member 162 prior to as well as during entry of the finger 160 into the slot 166 or 168 until the finger 160 reaches the end 174 or 176 of the slot 166 or 168, respectively.

Figure 5A:
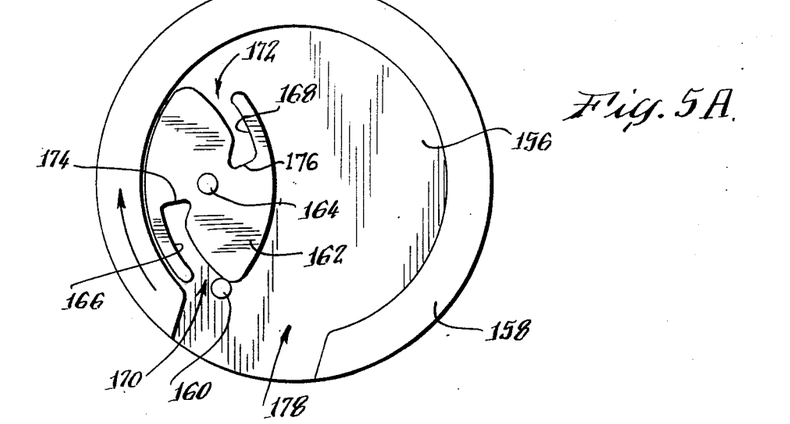
FIGS. 5A–F provide are enlarged plan views illustrating the positional relationship between the cam means and escapement means during rotation of the gear train.
Figure 5B:
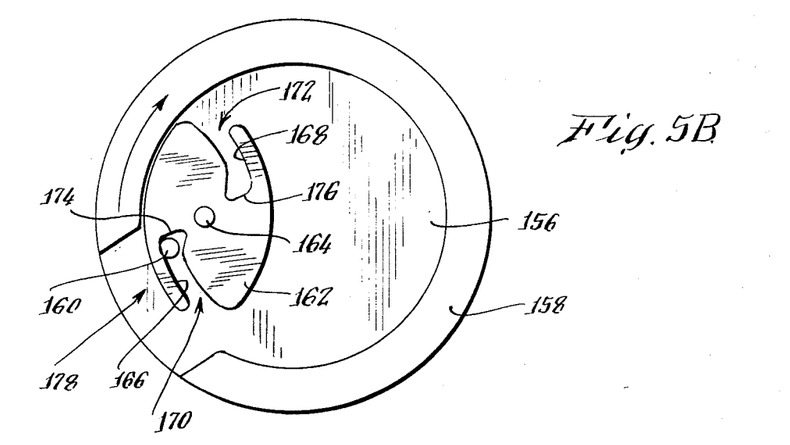
Figure 5C:
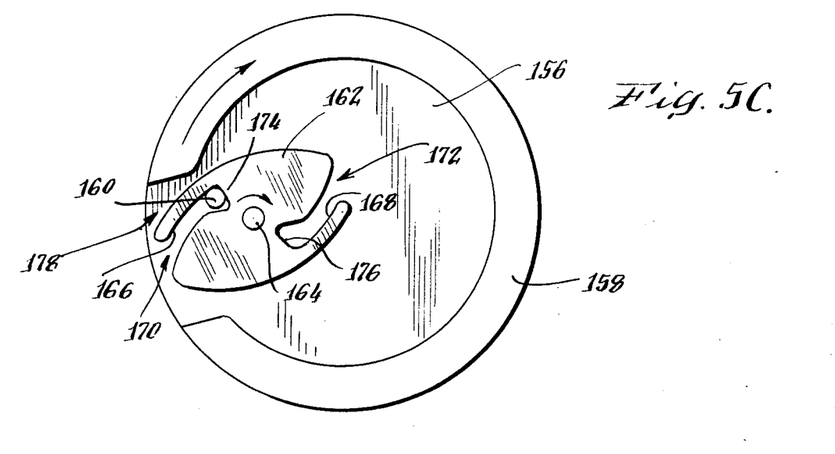

Specifically, as seen in FIG. 5A, the cam 156 and finger 160 rotate in the direction of the large arrow with the escapement member 162 remaining stationary and the finger 160 about to enter the slot 166 of the escapement member 164. In FIG. 5B, the finger 160 has entered the slot 166 and is moving toward the end 174 of the slot 166. Until the finger 160 engages the end 174 of the slot 166, the escapement member 162 will remain stationary. Once the finger 160 engages the end 174 of the slot 166, as seen in FIG. 5C, continued rotation of the finger 160 in the direction of the large arrow will carry the escapement member 162 with it, causing the escapement member 162 to rotate about its pivot pin 164 in the same direction as the cam member 156 which rotates in the direction of the small arrow. Advantageously, a portion 178 of the periphery 158 of the cam member 156, e.g., a portion representing approximately 1/6 of the circumference of the cam member 156 or approximately 60°, is removed to provide a window to accommodate rotation of the escapement member 162 about the pivot pin 164.

Figure 5D:
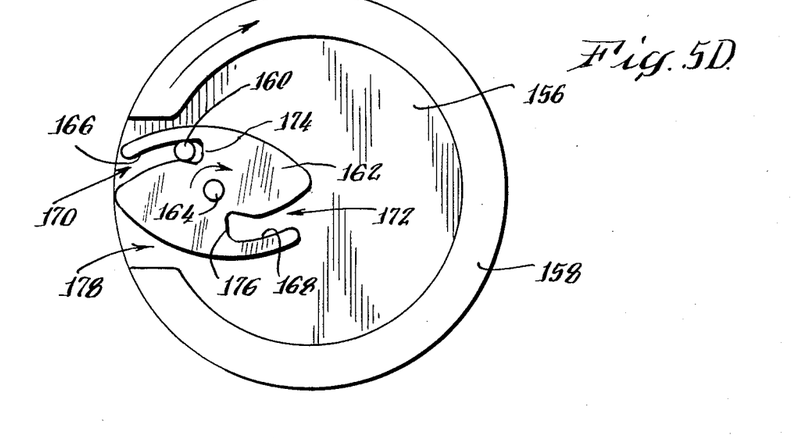
Figure 5E:
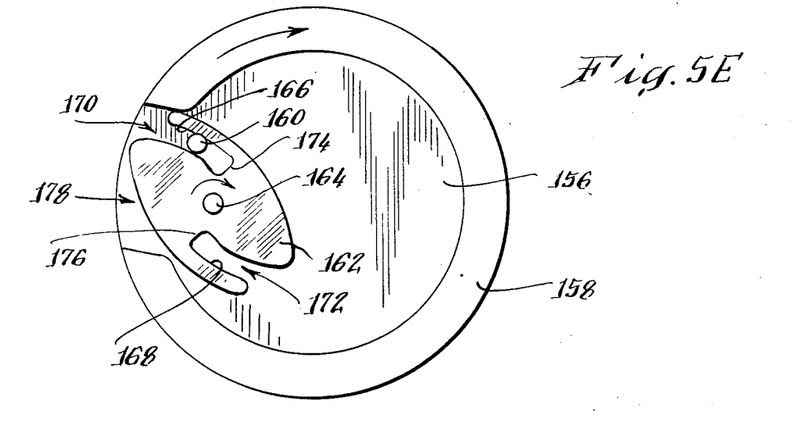
Figure 5F:
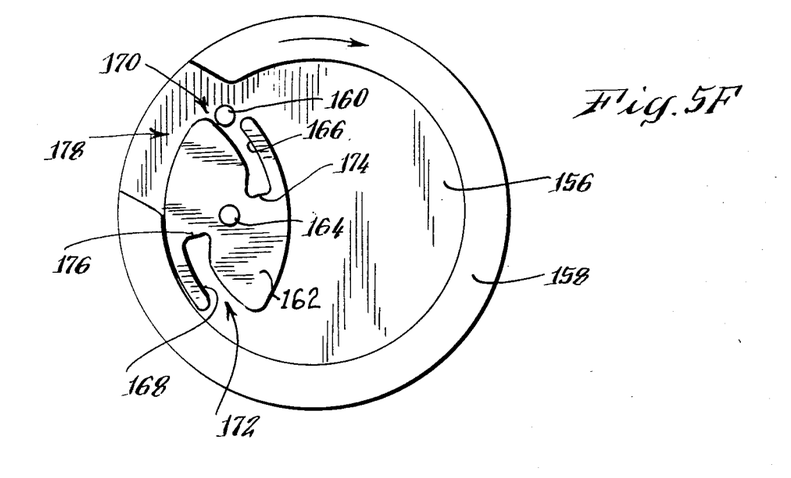

As seen in FIGS. 5D and 5E, the escapement member 162 continues to rotate about the pivot pin 164 in the direction of the small arrow as the finger 160 rotates with the cam member 156 with the finger 160 remaining in abutment with the sidewall of slot 166. However, once the finger 160 leaves the open end 170 of slot 166 and is no longer abutting against the sidewall of slot 166, rotation of the escapement member 162 ceases, see FIG. 5F. Thus, the finger 160 will rotate the escapement member 162 through 180°. Thereafter, the escapement member 162 will remain stationary for a predetermined dwell period, e.g., 45 to 50 seconds, until continued rotation of the cam member 162 causes the finger 160 to enter the other slot 168 and engage its end 176, whereupon the escapement member 162 is again rotated 180° to its initial or starting position. The escapement member 162 will again remain stationary for the same predetermined dwell period, until the finger 160 reaches the end 174 of the slot 166 whereupon the escapement member 162 and therefore the socket 60 will undergo a 180° rotation. This periodic rotation of the socket 60 and therefore the swaged end portion 48 continues until the swaged end portion 48 is disengaged from socket 60 or the motor 92 is deenergized.

To operate the rotisiere 12, upper horizontal grill member 36 is removed from the slots 44 and 46 in end plates 24 and 26 and the food to be grilled is placed upon the lower horizontal grill member 38. The upper horizontal grill member 36 is then pressed into contact with the food to hold the same securely between the upper and lower horizontal grill members 36 and 38 with longitudinal members 40 positioned within slots 44 and 46. As previously mentioned, horizontal grill members 36 and 38 can be adjusted vertically in slots 44 and 46 to place the food in close proximity to the horizontal oven broiler (not shown), as desired. Additionally, the rotisserie grill 22 may be moved upwardly or downwardly relative to the horizontal oven broiler by moving both ends 30 of the peripheral support frame 28 from one slot 32 to another slot 34 in the vertical brackets 18 and 20.

The desired motion of the rotisserie grill 22 is then selected, i.e., continuous rotation or periodic 180° rotation with a predetermined dwell period, by inserting the corresponding socket 58 or 60 over swaged end portion 48 of the peripheral support frame 28 and clipping the spring mounting clip 90 of the flip-over drive mechanism 50 on the vertical bracket 18 to maintain the flip-over drive mechanism 50 in a fixed position relative to the rotisserie grill 22. The rotisserie 12 is then placed in the oven with the inclined grease pan 14 resting on the floor of the oven and the oven door is closed with the insulated leads 49 extending from the oven to the power source 51 through the door jam of the closed oven door. The broiler is then turned on and the switch 53 is switched on to energize the DC motor of the flip-over drive mechanism 50 to rotate the rotisserie grill 22 continuously or periodically in accordance with the socket 58 or 60 selected.

Referring particularly to FIG. 4, energization of the motor 92 will cause its drive shaft 100 to rotate thereby rotating the pinion 62 affixed thereto. The pinion 62 in turn meshses with the first gear 64 to rotate it about pin 112. The pinion portion 66 of the first gear 64 then meshes with the second gear to rotate it about the stepped shaft 118. The pinion portion 70 of the second gear 68 meshes with the third gear 72 to rotate it about stepped pin 124. The pinion portion 74 of the third gear then meshes with the fourth gear 76 to rotate it about stationary pin 136. The pinion portion 78 of the fourth gear 76 meshes with the fifth gear 80 to rotate it about pin 144. The pinion portion 82 of the fifth gear 80 meshes with the sixth gear 84 to rotate it and socket 58 continuously. Finally, the sixth gear 84 meshes with the seventh gear 85 to rotate cam member 156 and thereby provide periodic rotation of escapement member 162 and periodic rotation of the socket 60 in the manner previously described with reference to FIGS. 5A–F.

Considering the gear ratios of the gear train 54 it is apparent that the RPM of the DC motor 92 is reduced by the gear train 54 as follows 8/37 (pinion 62 and first gear 64) × 10/42 (pinion portion 66 and second gear 68) × 10/48 (pinion portion 70 and third gear 72) × 10/42 (pinion portion 74 and fourth gear 76) × 10/42 (pinion portion 78 and fifth gear 80) × 10/38 (pinion portion 82 and sixth gear 84) or by approximately 6000 times or to 0.0016 for rotation of the socket 58, and by the same amount multiplied by 38/38 (sixth gear 84 and seventh gear 85), or 1, when the socket 60 is periodically rotated by the escapement member 162.

From the foregoing it should be apparent that a novel and compact flip-over drive mechanism is provided which is capable of providing 180° periodic (flip-over) rotation with a predetermined dwell period for a portable oven mounted rotisserie, as well as continuous rotation of the rotisserie, as desired.

It should be apparent to those skilled in the art that various modifications may be made in the present invention without departing from the spirit and scope thereof, as described in the specification and defined in the appended claims.

What is claimed is:

1. A flip-over drive system for a rotisserie, comprising:

drive means;

gear train means driven by said drive means;

cam means mechanically coupled to said gear train means for rotation in response to the driving of said gear train means by said drive means, said cam means including a downwardly extending projection and a downwardly extending peripheral portion which extends partially around the periphery of said cam to provide a window in said peripheral portion;

rotatable escapement means positioned relative to said cam means for periodic rotation through the window on said cam means in the same direction of rotation as the direction of rotation of the cam means upon engagement of the escapement means by the downwardly extending projection on said cam means;

socket means mechanically coupled to said escapement means for rotation therewith, said socket means being configured to receive the end of a rotisserie shaft, whereupon said socket means and the rotisserie shaft received therein are rotated to a first predetermined angular position upon engagement of said escapement means by the downwardly extending projection on said cam means and remain in the first predetermined angular position for a predetermined dwell period until the downwardly extending projection on said cam means re-engages the opposite end of said escapement means whereupon said socket means and the rotisserie shaft are rotated to a second predetermined angular position and remain in the second predetermined angular position for a predetermined dwell period.

2. The flip-over drive system recited in claim 1, wherein:

said cam means is coupled to the bottom of a gear of said gear train means; and said escapement means is pivotally mounted relative to said cam means and includes a pair of slots for receiving said downwardly extending projection to periodically rotate said socket means in response to rotation of said cam means by said gear train means.

3. The flip-over drive system recited in claim 2, wherein:

said escapement means is generally oval shaped with said pair of slots being formed in said escapement means at positions diametrically opposite to one another and generally following the periphery of said escapement means.

4. The flip-over drive system recited in claim 3, wherein:

said escapement means rotates in the same direction as said cam means upon engagement of said escapement means with said downwardly extending projection.

5. The flip-over drive system recited in claim 1, wherein:

said socket means is configured to receive a swaged end portion of the rotisserie shaft.

6. The flip-over drive system recited in claim 1, including:

housing means for containing the flip-over drive system;

a mounting clip attached to said housing means and adapted to clip onto a mounting bracket of the rotisserie to maintain the position of the flip-over drive system relative to said mounting bracket when the rotisserie shaft is mounted within said socket means.

7. The flip-over drive system recited in claim 1, including:

second socket means mechanically coupled to a gear of said gear train means, said second socket means also being configured to receive the end of the rotisserie shaft, whereupon said second socket means and the rotisserie shaft are rotated continuously in response to rotation of the gears of said gear train means by said drive means.

8. The flip-over drive system recited in claim 7, wherein:

said second socket means has a generally square configuration to receive the end of the rotisserie shaft.

9. The flip-over drive system recited in claim 1, including:

battery operated power supply means electrically connected to said drive means for actuating said drive means.

10. The flip-over drive system recited in claim 1, wherein:

the rotisserie shaft is coupled to the rotisserie;

the rotisserie includes a pair of vertical brackets with the rotisserie shaft being pivotally mounted thereto;

end plates affixed to the rotisserie shaft for rotation therewith;

adjustable horizontal grill members mechanically coupled to said end plates for adjustment relative to said end plates to accommodate food having different thicknesses;

a grease pan coupled to said vertical brackets and positioned below said adjustable horizontal grill members, said grease pan adapted to rest on the floor of an oven to support the rotisserie.

11. The flip-over drive system recited in claim 10, wherein:

said vertical brackets include a plurality of adjustment slots for adjusting the position of the rotisserie shaft relative to said vertical brackets and therefore the position of adjustable horizontal grill members relative to the horizontal oven broiler.

12. The flip-over drive system recited in claim 1, wherein:

said gear train means includes a plurality of gears with two of said gears mounted for rotation about the same axis.

13. The flip-over drive system recited in claim 12, wherein:

one of said gears mounted for rotation about the same axis is coupled to said cam means.

14. The flip-over drive system recited in claim 1, wherein:

said drive means includes a motor having a motor mount;

housing means for containing the flip-over drive system including said motor;

said housing means including anti-rotation means for coacting with said motor mount to prevent rotation of said motor on said motor mount.

15. The flip-over drive system recited in claim 1, wherein:
said gear train means provides a drive reduction of approximately 0.00016.

16. The flip-over drive system recited in claim 1, wherein:
the predetermined dwell periods in the first and second predetermined angular positions are equal.

17. The flip-over drive system recited in claim 1, wherein:
the periodic engagement of said escapement means by said cam means continues in response to the driving of said gear train means by said drive means to periodically rotate said socket means and the rotisserie shaft between the first and second predetermined angular positions.

18. The flip-over drive system recited in claim 1, wherein:
said first and second predetermined angular positions are 180° apart.

19. A flip-over drive system for a rotisserie, comprising:
drive means;
gear train means driven by said drive means;
cam means mechanically coupled to said gear train means for rotation in response to the driving of said gear train means by said drive means, said cam means is coupled to the bottom of a gear of said gear train means and includes a downwardly extending projection and a downwardly extending peripheral portion which extends partially around the periphery of said cam means to provide a window through which said escapement means rotates upon engagement with said downwardly extending projection;
rotatable escapement means positioned relative to said cam means for periodic rotation upon engagement with said cam means, said escapement means is pivotally mounted relative to said cam means and includes a pair of slots for receiving said downwardly extending projection to periodically rotate said socket means in response to rotation of said cam means by said gear train means;
socket means mechanically coupled to said escapement means for rotation therewith, said socket means being configured to receive the end of a rotisserie shaft, whereupon said socket means and the rotisserie shaft received therein are rotated to a first predetermined angular position upon engagement of said escapement means by said cam means and remain in the first predetermined angular position for a predetermined dwell period until said cam means re-engages said escapement means whereupon said socket means and the rotisserie shaft are rotated to a second predetermined angular position and remain in the second predetermined angular position for a predetermined dwell period;
housing means for containing the flip-over drive system; and
a mounting clip attached to said housing and adapted to clip onto a mounting bracket of the rotisserie to maintain the position of the flip-over drive system relative to said mounting bracket when the rotisserie shaft is mounted within said socket means.

20. The flip-over drive system recited in claim 19, including:
second socket means mechanically coupled to a gear of said gear trains means, said second socket means also being configured to receive the end of the rotisserie shaft, whereupon said second socket means and the rotisserie shaft received therein are rotated continuously in response to rotation of the gears of said gear train means by said drive means.

21. The flip-over drive system recited in claim 20, wherein:
said second socket means has a generally square configuration to receive the end of the rotisserie shaft.

22. The flip-over system recited in claim 19, wherein:
the rotisserie shaft is coupled to the rotisserie;
the rotisserie shaft includes a pair of vertical brackets with the rotisserie shaft being pivotally mounted thereto;
end plates affixed to the rotisserie shaft for rotation therewith;
adjustable horizontal grill members mechanically coupled to said end plates for adjustment relative to said end plates to accommodate food having different thicknesses;
a grease pan coupled to said vertical brackets and position below said adjustable horizontal grill members, said grease pan adapted to rest on the floor of an oven to support the rotisserie.

23. The flip-over drive system recited in claim 22, wherein:
said vertical brackets include a plurality of adjustment slots for adjusting the position of the rotisserie shaft relative to said vertical brackets and therefore the position of adjustable horizontal grill members relative to the horizontal oven broiler.

24. The flip-over drive system recited in claim 19, wherein:
said escapement means is generally oval shaped with said pair of slots being formed in said escapement means at positions diametrically opposite to one another and generally following the periphery of said escapement means.

25. The flip-over drive system recited in claim 19, wherein:
said escapement means rotates in the same direction as said cam means upon engagement of said escapements means with said downwardly extending projection.

26. The flip-over drive system recited in claim 19, wherein:
said gear train means includes a plurality of gears with two of said gears mounted for rotation about the same axis.

27. The flip-over drive system recited in claim 26, wherein:
one of said gears mounted for rotation about the same axis is coupled to said cam means.

28. The flip-over drive system recited in claim 19, wherein:
said drive means includes a motor having a motor mount;
said housing means including anti-rotation means for coacting with said motor mount to prevent rotation of said motor on said motor mount.

29. The flip-over drive system recited in claim 19, wherein:
said gear train means provides a drive reduction of approximately 0.00016.

30. The flip-over drive system recited in claim 29, wherein:
said socket means has a generally hexagonal configuration to receive the end of the rotisserie shaft.

31. The flip-over drive system recited in claim 19, wherein:
the predetermined dwell periods in the first and second predetermined angular positions are equal.

32. The flip-over drive system recited in claim 19, wherein:
the periodic engagement of said escapement means by said cam means continues in response to the driving of said gear train means by said drive means to periodically rotate said socket means and the rotisserie shaft between the first and second predetermined angular positions.

33. The flip-over drive system recited in claim 19, wherein:
said first and second predetermined angular positions are 180° apart.

34. The flip-over drive system recited in claim 19, wherein:
said socket means is configured to receive a swaged end portion of the rotisserie shaft.

35. A flip-over drive system for a rotisserie, comprising:
drive means;
gear train means driven by said drive means, said gear train means including a plurality of gears with two of said gears mounted for rotation about the same axis with one of said gears mounted for rotation about the same axis being coupled to a cam means;
said cam means being mechanically coupled to said gear train means for rotation in response to the driving of said gear train means by said drive means, said cam means is coupled to the bottom of a gear of said gear train means and includes a downwardly extending projection and a downwardly extending peripheral portion which extends partially around the periphery of said cam means to provide a window through which said escapement means rotates upon engagement with said downwardly extending projection;
rotable escapement means positioned relative to said cam means for periodic rotation upon engagement with said cam means, said escapement means is pivotally mounted relative to said cam means and includes a pair of slots for receiving said downwardly extending projection to periodically rotate said socket means in response to rotation of said cam means by said gear train means, said escapement means is generally oval shaped with said pair of slots being formed in said escapement means at positions diametrically opposite to one another and generally following the periphery of said escapement means and said escapement means rotates in the same direction as said cam means upon engagement of said escapement means with said downwardly extending projection;
socket means mechanically coupled to said escapement means for rotation therewith, said socket means being configured to receive the end of a rotisserie shaft, whereupon said socket means and the rotisserie shaft received therein are rotated to a first predetermined angular position upon engagement of said escapement means by said cam means and remain in the first predetermined angular position for a predetermined dwell period until said cam means re-engages said escapement means whereupon said socket means and the rotisserie shaft are rotated to a second predetermined angular position and remain in the second predetermined angular position for a predetermined dwell period, the first and second predetermined angular positions are 180° apart and the predetermined dwell periods in the first and second predetermined angular positions are equal, the periodic engagement of said escapement means by said cam means continues in response to the driving of said gear train means by said drive means to periodically rotate said socket means and the rotisserie shaft between the first and second predetermined angular positions;
housing means for containing the flip-over drive system; and
a mounting clip attached to said housing and adapted to clip onto a mounting bracket of the rotisserie to maintain the position of the flip-over drive system relative to said mounting bracket when the rotisserie shaft is mounted within said socket means.

36. A flip-over drive system for a rotisserie, comprising:
a rotatable driven cam member having a circular cylindrical peripheral wall portion;
said cylindrical wall portion of the cam member having a window therein;
a rotatable escapement member of generally oval configuration with two opposite exterior curved surfaces;
said escapement member having a pivot located interiorly with respect to said peripheral wall portion;
each of said exterior curved surfaces on the escapement member being shaped to conform to and ride against said peripheral wall portion of the cam member for preventing rotation of the escapement member;
said escapement member having diametrically opposed slots extending into its opposite ends with said slots being offset in opposite directions with respect to said pivot;
said cam member also including a projection positioned and sized to freely enter into one of said slots during each rotation of said cam member;
said projection being located near said window for entering into the respective slot for causing the escapement member to rotate through 180° while said window is near said escapement member for permitting said projection to produce said 180° rotation of the escapement member and thereafter for said peripheral wall portion to ride against one of the exterior curved surfaces of the escapement member for holding it stationary until said projection enters the other respective slot; and
means for coupling said rotatable escapement member to a rotisserie shaft for causing said shaft to rotate 180° with the escapement member and then to dwell for a period of time while said peripheral wall rides against an exterior curved surface of the escapement member.

* * * * *